Sept. 28, 1937.    J. REICHERT    2,094,024
APPARATUS FOR WINDING AND FORMING COILS
Filed April 17, 1934    5 Sheets-Sheet 1

INVENTOR
Julius Reichert
BY
Reuben J. Carlson
ATTORNEY

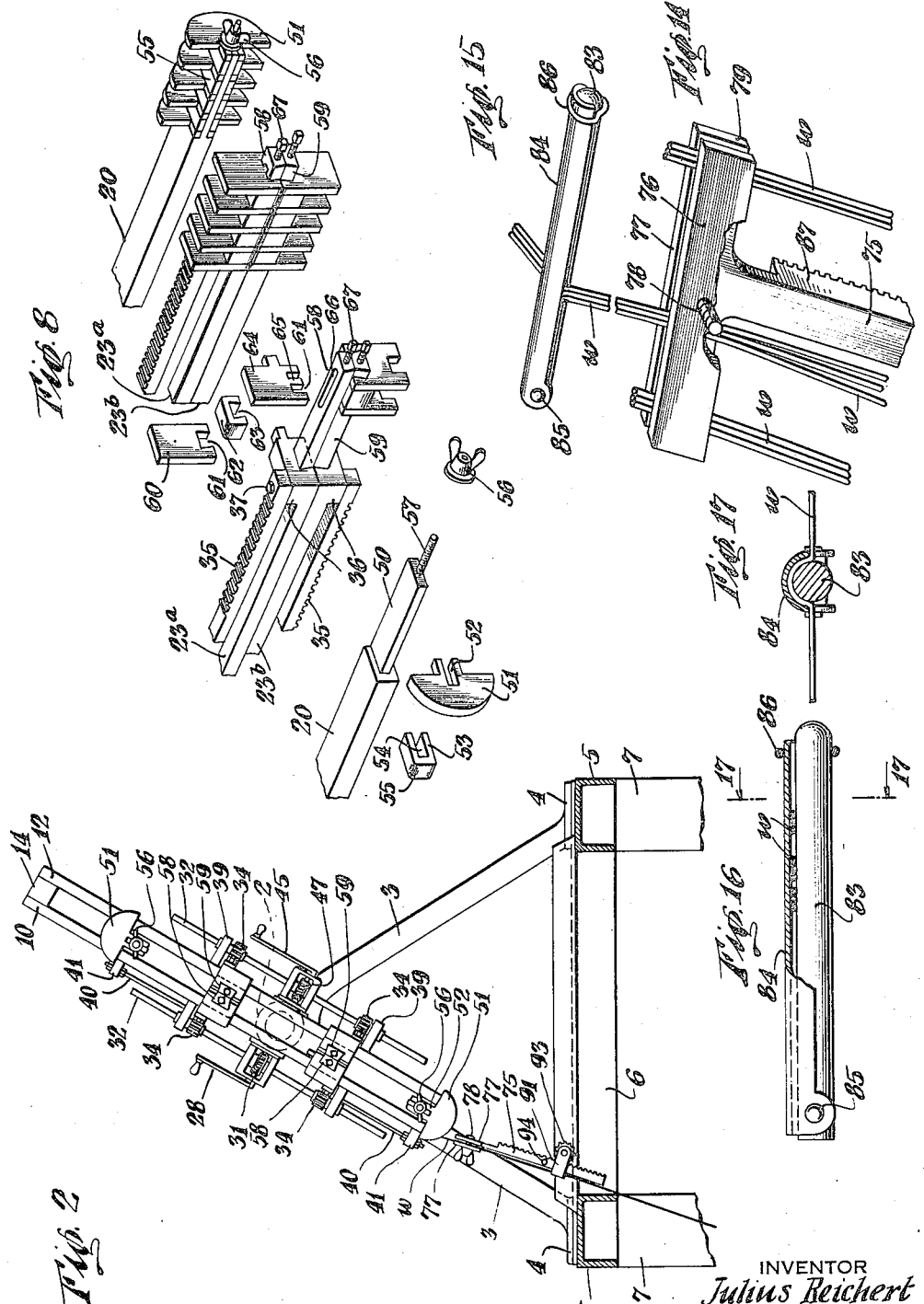

Sept. 28, 1937.   J. REICHERT   2,094,024
APPARATUS FOR WINDING AND FORMING COILS
Filed April 17, 1934   5 Sheets-Sheet 3
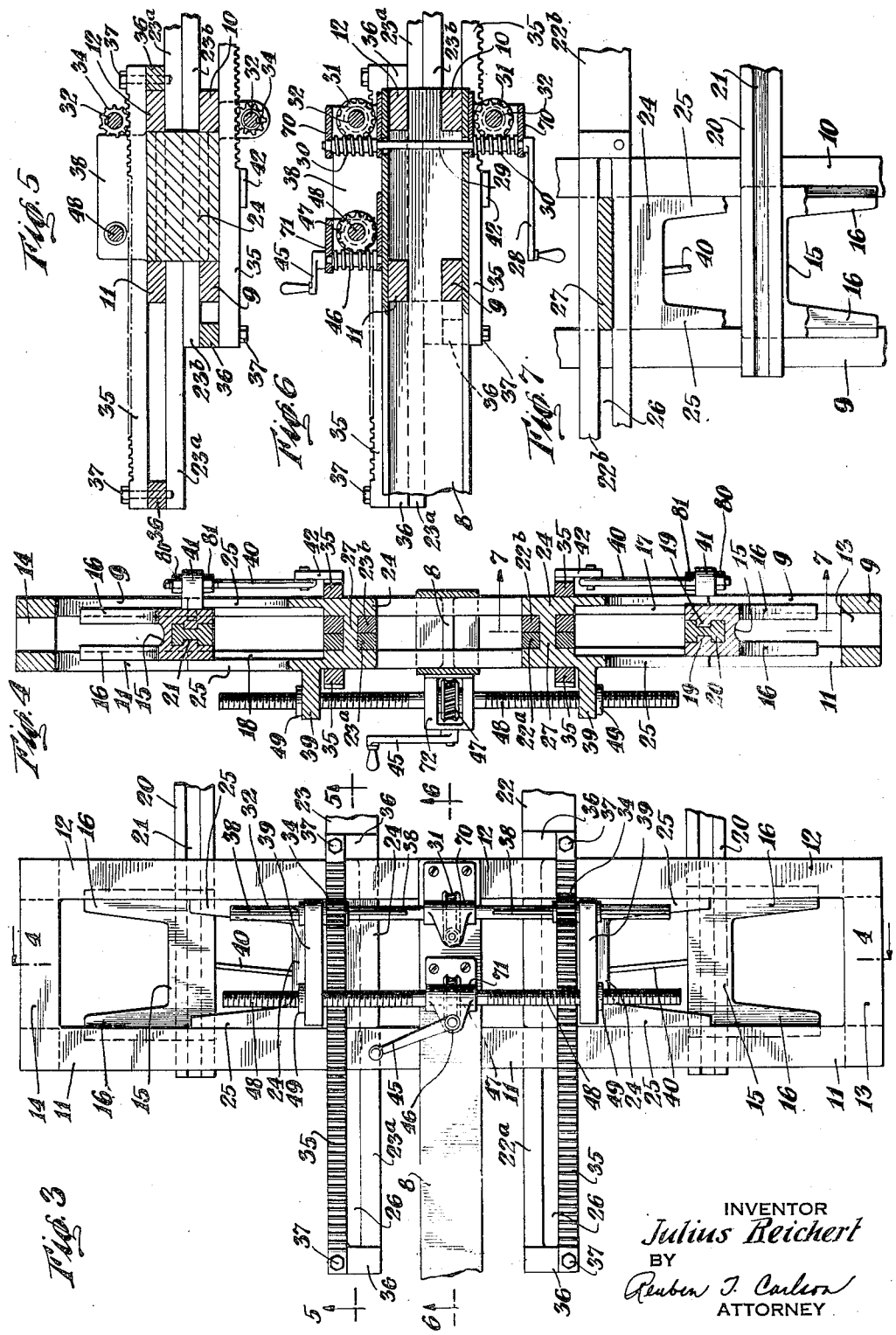
INVENTOR
Julius Reichert
BY
Reuben T. Carlson
ATTORNEY

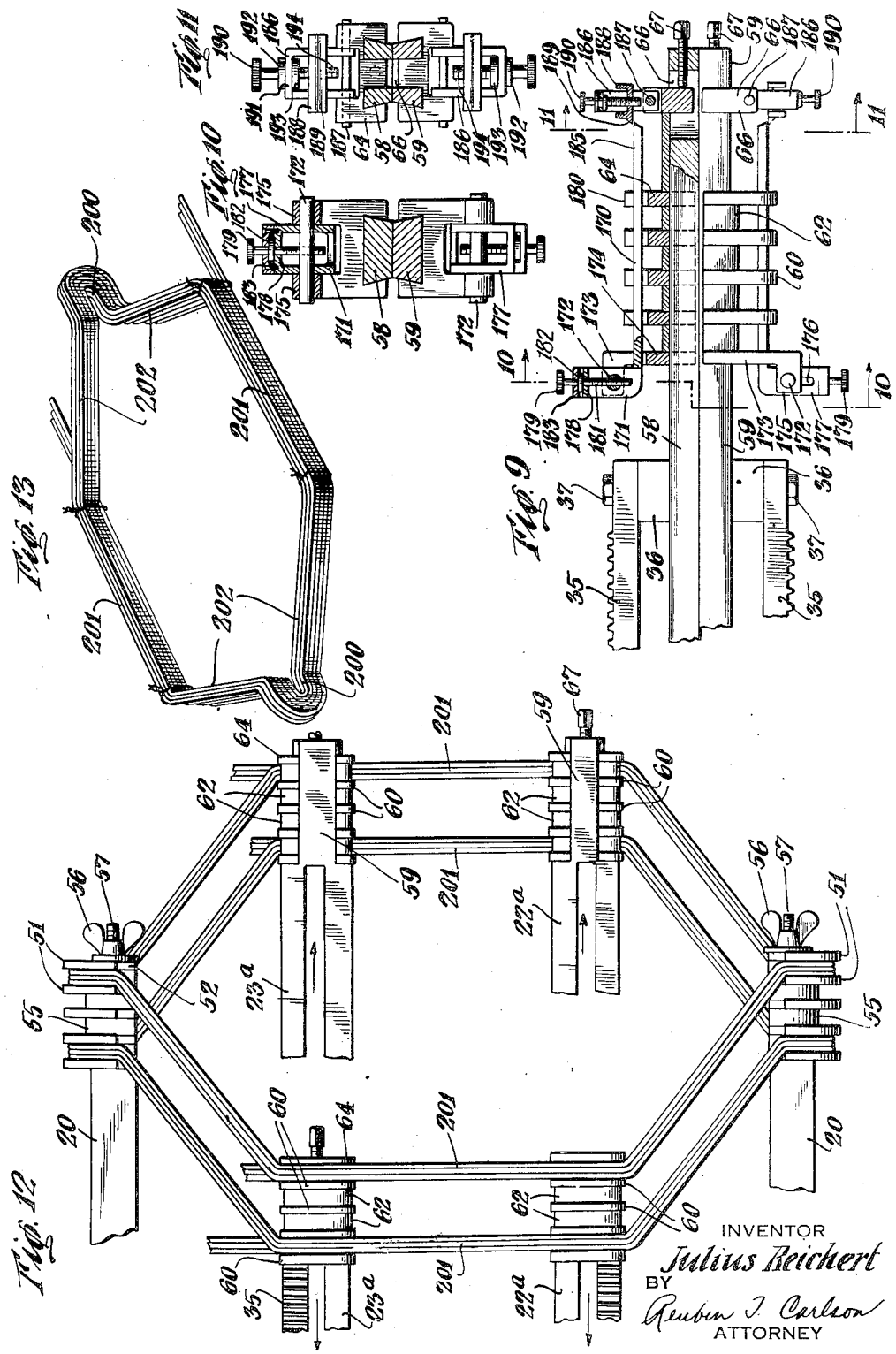

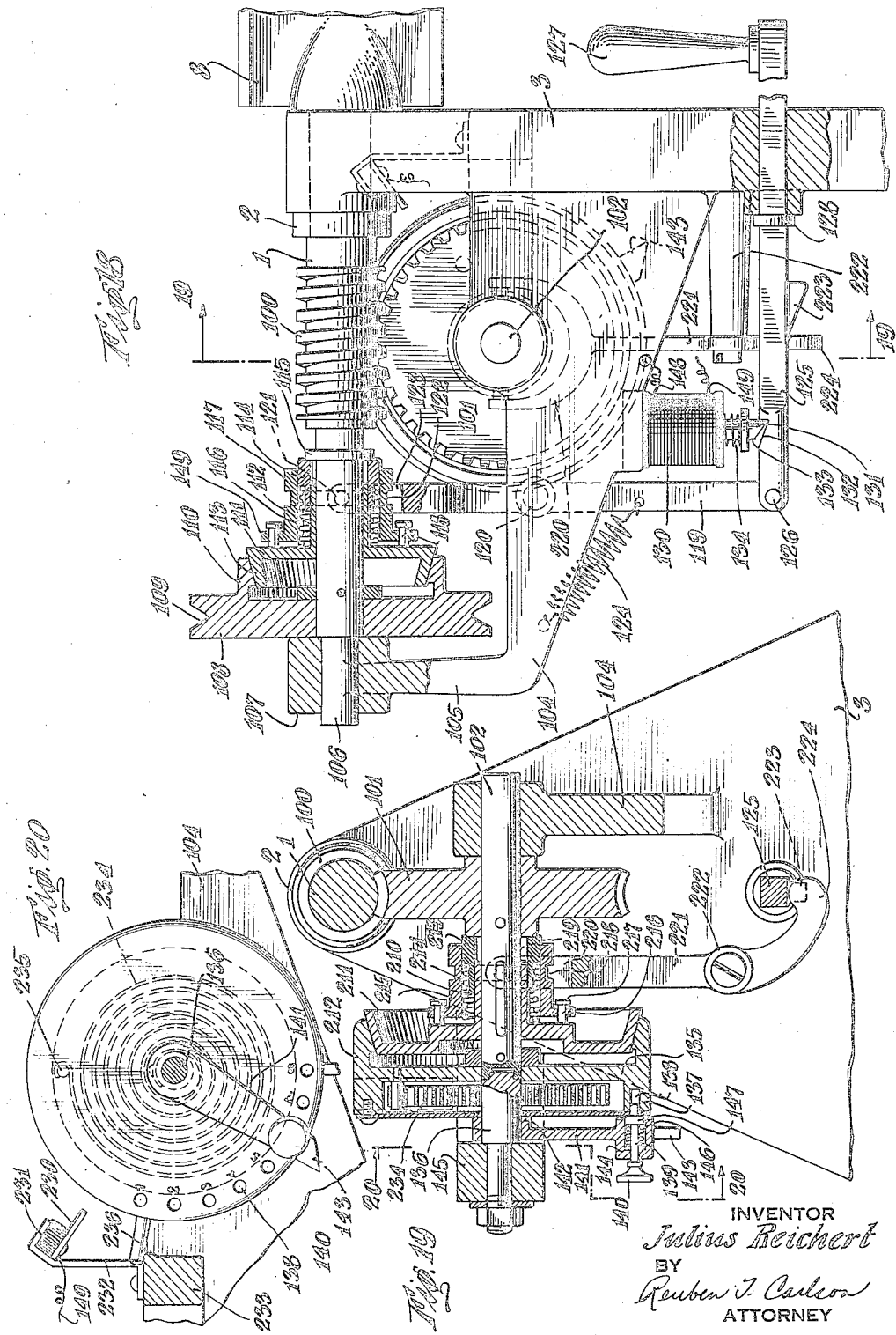

Patented Sept. 28, 1937

2,094,024

UNITED STATES PATENT OFFICE 2,094,024

APPARATUS FOR WINDING AND FORMING COILS

Julius Reichert, Astoria, N. Y.

Application April 17, 1934, Serial No. 721,049

30 Claims. (Cl. 140—92.2)

This invention relates to an apparatus for winding and forming coils, and more particularly to a machine for winding and shaping armature and stator coils used in electric dynamos and motors. Armature and stator coils used in electric motors and dynamos vary in shape and size according to the type and size of motor or dynamo to which they are to be applied. Coil winding and forming machines heretofore provided have possessed a number of draw-backs which have made their use and operation unsatisfactory. By way of example, in the machines heretofore provided, only one coil can be shaped and formed at a time. Since most motors and dynamos require a considerable number of coils, the operation of winding a sufficient number of coils for the motor armature has consequently consumed considerable time and labor. Furthermore, machines heretofore provided have required a number of manual manipulations in forming the coils which have required considerable skill to execute, with the result that the coils produced are often not uniform in size and shape, and the coils are further defective in that the strands of wire are not in proper position nor assembled with sufficient compactness and uniformity to produce a high-grade product. In addition to the above defects, coil-forming machines heretofore provided have been complicated in construction, cumbersome to operate and expensive and wasteful in material.

An object of this machine is to provide a coil-winding and forming machine upon which a plurality of coils may be simultaneously made in one operation.

Another object of this invention is to provide a coil-winding and forming machine which is substantially automatic in operation and which will produce coils which are compact, accurate and uniform in shape, form and size.

Another object of this invention is to provide a coil-winding and forming machine which can be easily and quickly adjusted to efficiently and effectively wind and form coils of any desired shape, form or size.

Still another object of this invention is to provide a coil-winding and forming machine adapted to simultaneously and automatically wind and shape a plurality of coils with a minimum number of manipulations by the operator, the machine being further provided with means for quickly attaching the wires in position to be operated upon, and with means by which the finished coils may be quickly removed from the machine without damage or injury thereto.

Still another object of this invention is to provide a coil-winding and forming machine having means which automatically distributes the wire in proper position in the coil during the winding operation.

Another object of this invention is to provide a coil-winding and forming machine having associated therewith interchangeable parts which may be quickly attached and detached to form coils of different shapes, forms, and cross sectional size.

Another object of this invention is to provide a coil-winding and forming machine having associated therewith means for automatically throwing the machine out of operation when the desired number of strands of wire have been wound into the respective coils.

Another object of this invention is to provide an automatic wire-winding and forming machine particularly adapted for the manufacture of armature and stator coils for electric dynamos and motors, which is strong and sturdy in construction and substantially fool-proof in operation, which can be operated by unskilled labor, which requires a small amount of floor space, which comprises relatively few moving parts, and which is relatively inexpensive to manufacture and assemble.

Other objects of this invention will become apparent as the disclosure proceeds.

According to this invention, a frame structure is provided, rotatively mounted on a suitable shaft which may be driven by hand or by motor. A plurality of blocks, the number depending upon the shape of the coil to be formed, are slidably mounted within the frame. Where an hexagonally shaped coil is to be formed, such as is generally used for armature coils, four blocks, mounted as above described, are provided. The coils are wound around a plurality of arms projecting laterally from the frame, each arm being adjustably connected to the slidable blocks mounted in the frame. Where hexagonal coils are to be formed, two outer arms and four intermediate arms are provided. The ends of the coils are wound around the two outer arms and the sides of the coils are wound around the intermediate arms. The outer arms are provided with a plurality of interchangeable and replaceable partition elements upon which the respective coils are wound. The partition elements are so shaped as to give the end portions of the coil the desired shape and contour. The intermediate arms are also provided with interchangeable and replaceable partition elements around which the side portions of the coil are wound.

In winding the coils one or more strands of wire are provided for each coil to be formed, the strand or strands being positioned between each of the partition elements provided on one of the outer arms. All the strands forming the respective coils are secured in position by means of an adjustable clamp applied to the ends of the respective strands. The frame is then rotated, during which operation the respective strands are wound around the outer arms and the intermediate arms. During this operation the partition elements mounted on all the arms are in alignment, and a closed coil is thus formed. When the desired number of turns of wire have been wound around the arms, the rotation of the frame is stopped.

The coils are then expanded into the desired shape and form by drawing one set of intermediate arms on one side of the coil toward the frame, and simultaneously pushing the other set of intermediate arms on the other side of the coil away from the frame until the coils assume the desired hexagonal shape. The outer arms, during this operation, remain as before, and the end portions of the coils are held in their original position. The desired offset in the end portions of the coils is produced when the side portions of the coils are expanded.

The expanding operation is performed by the operator by a simple turn of a crank geared to a pair of shafts, which are rotated by turning the crank. One shaft is operatively connected to one set of intermediate arms engaging one side of the coils. The other shaft is operatively connected to the other set of intermediate arms engaging the other side of the coils. The entire coil-expanding operation is performed by a simple clockwise turn of the crank. The arms are returned to their coil-winding position by a corresponding counter-turn clockwise of the crank.

To effect uniform expansion of the coils, the outer arms are automatically drawn inwardly toward the intermediate arms, as the coil-expanding operation proceeds, by means of a link connecting the outer arm to one of the intermediate arms. Each outer arm is thus automatically drawn inwardly by the link connected thereto, while one set of intermediate arms is pushed away from and the other set of arms are drawn toward the frame.

Mechanism is provided for automatically weaving each strand of wire so as to compactly lay the strands in proper position to produce a coil of the desired thickness and uniformity of cross section. The weaving mechanism is operatively connected and synchronized with the drive shaft upon which the winding frame is mounted. Smooth and uniform laying of the coil, in compact arrangement, is thus assured.

Mechanism is also provided which records the number of turns of wire which are wound on to the coils. This mechanism may be adjusted so that the desired number of turns are wound on to each coil, and when the desired number of turns have been completed, to automatically throw off the power and halt the winding operation of the machine. The mechanism may be set to halt the machine at the end of any desired winding operation. The machine is substantially automatic in operation and does not require the careful attention which machines heretofore provided require.

After the coils have been completely shaped and formed they may be easily removed by inwardly drawing the outer paired arms so as to permit the coils to hang loosely on the end of these arms. The mechanism provided for this purpose comprises a threaded shaft which may be rotated by means of a suitable crank operatively connected thereto by suitable gearing. Each end of the threaded shaft extends through a threaded lug projecting from the intermediate slide blocks. Rotation of the crank moves the intermediate slide blocks towards or away from the axis of rotation of the machine.

The partition elements carried on the ends of the outer arms may be easily removed by the removal of a retaining nut threaded to the ends of the respective outer arms. When the coil has been removed the partition elements are replaced in position on the outer arms and the machine is ready for another winding operation.

The partition elements carried by both the outer and the intermediate arms are contoured to give the coils wound thereon the desired shape and size. The partition elements are interchangeable and replaceable, and thus the machine is adapted to wind a vast variety of coils of different shape, size and form by the application of proper partition elements.

The machine may be mounted on any suitable table or standard convenient or desirable. The machine occupies a minimum space, is substantially automatic in operation, is adapted to wind coils of different shape, size and form simultaneously, and any number of coils may be wound simultaneously substantially without additional labor.

In order that a clear understanding of this invention may be had, attention is directed to the accompanying drawings, forming a part of this specification, in which:

Figure 2 is an end view of the machine mounted upon a supporting table;

Figure 3 is a fragmentary plan view of the machine showing particularly the rotatable frame and the adjustable winding arms associated therewith;

Figure 4 is a vertical cross sectional view taken longitudinally of the rotatable frame along the line 4—4 of Figure 3;

Figure 5 is a transverse cross sectional view showing the frame and the associated intermediate winding arms, this view being taken on line 5—5 of Figure 3;

Figure 6 is a transverse cross sectional view through the rotatable frame, showing particularly the means for effecting adjustment of the winding arms, this view being taken on line 6—6 of Figure 3;

Figure 7 is a cross sectional view through a portion of the rotatable frame and associated slide blocks and winding arms, this view being taken from line 7—7 on Figure 4;

Figure 8 is an enlarged perspective view of the winding arms of the machine, this view showing particularly the coil retaining partition elements associated therewith, certain of the partition elements being shown exploded away from the winding arms to more clearly illustrate the construction;

Figure 9 is an enlarged elevational view of one of the intermediate winding arms showing the partition elements associated therewith of somewhat modified construction and provided with an adjustable locking pin for retaining the wound coils in fixed position on the arms during the expanding and shaping operation thereof;

Figure 10 is a transverse cross sectional view through the intermediate winding arms and associated modified partition elements, this view being taken on line 10—10 of Figure 9;

Figure 11 is a transverse cross sectional view through the intermediate winding arms and associated modified partition elements, this view being taken on line 11—11 of Figure 9;

Figure 12 is an enlarged plan view of the winding arms and associated partition elements, the intermediate winding arms being shown in coil-expanding position to illustrate how the coil-expanding operation is performed;

Figure 13 is a fragmentary perspective view of an armature coil as it appears when fully shaped and formed by my machine;

Figure 14 is an enlarged fragmentary perspective view of the wire guiding and tightening device used to guide the strands of wire onto the partition elements, the device also being adjustable so as to exert the desired drag upon the wire strands as they are wound about the winding arms;

Figure 15 is a perspective view of a locking bolt to which the ends of the wire strands are locked, the key then being attached to one of the winding arms of the machine so as to draw the wire strands around the frames when rotated;

Figure 16 is a side view of the locking bolt, certain parts being broken away to illustrate the construction;

Figure 17 is a cross sectional view through the locking bolt, this view being taken on the line 17—17 of Figure 16;

Figure 18 is an enlarged elevational view of the winding indicator and associated switch and stop mechanism operatively connected to the driving shaft of the machine;

Figure 19 is a vertical cross sectional view through the winding indicator and associated switch and stop mechanism, this view being taken on line 19—19 of Figure 18; and Figure 20 is an end view of the winding indicator and associated stop mechanism as they appear when looking along line 20—20 of Figure 19.

Similar reference characters refer to similar parts throughout the several views of the drawings and specification.

Figure 1:
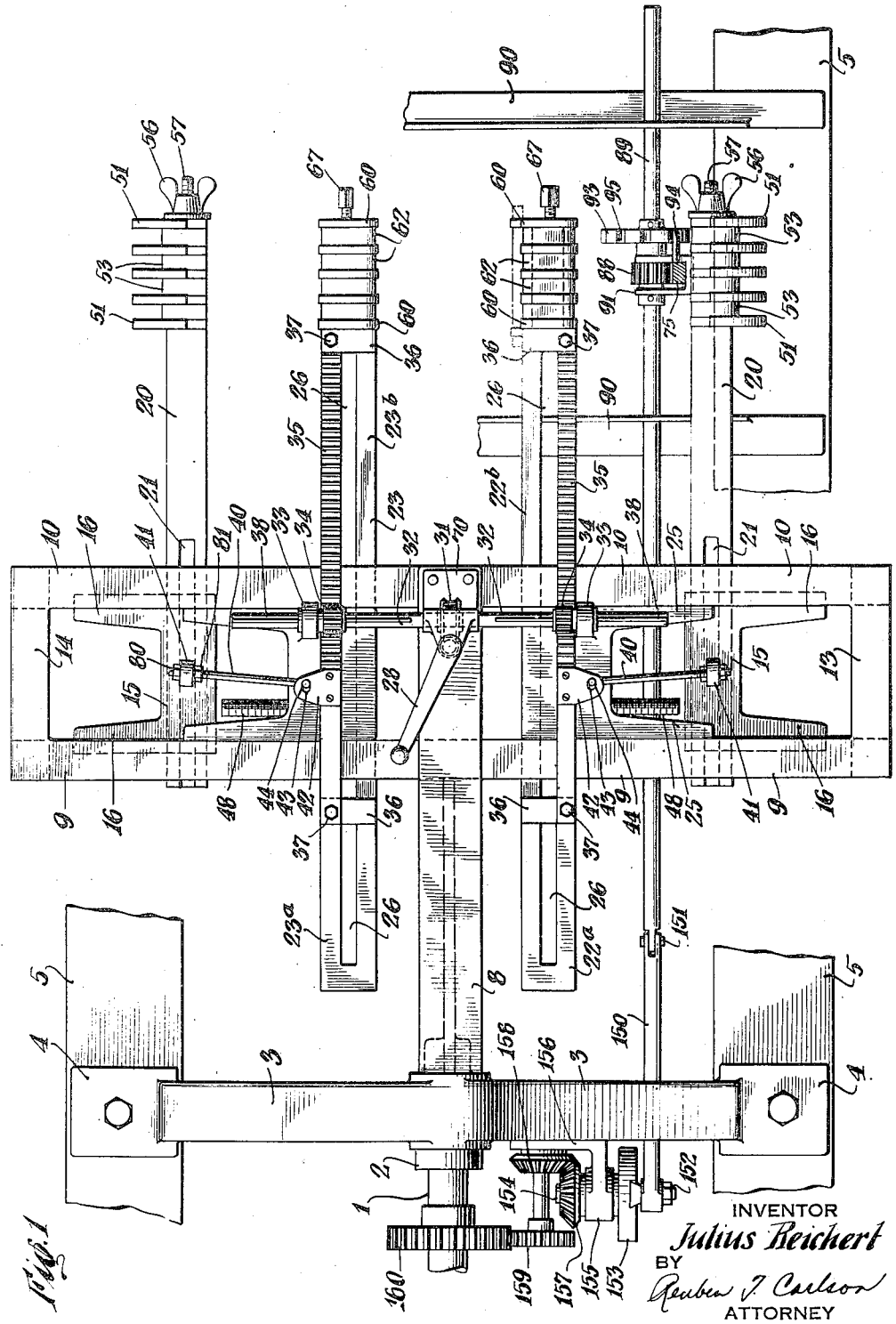
Figure 1 is a plan view of my coil winding and forming machine in which certain parts, such as the driving motor and associated winding indicator and switch mechanism, are omitted from this view.

Referring more particularly to Figures 1 and 2, the operating parts of the coil winding and forming mechanism are operatively connected to a drive shaft 1 rotatably mounted in a bearing 2 supported by a sturdy V-shaped frame 3. The V-shaped frame may be provided with feet 4, bolted or otherwise secured to a suitable operating table. The table may be of any convenient size and form, comprising, for example, the horizontal frame members 5, and the transverse frame members 6 suitably secured and supported by the legs 7. One end of the drive shaft is connected to a hand crank, driving motor or other suitable driving mechanism. The other end of the shaft is fixed to a shaft extension member 8, upon which is mounted a rectangular frame. The shaft extension 8 may be an I-beam, or other shaped member of sufficient strength to carry the rectangular frame and associated parts.

Referring more particularly to Figures 3 and 4, the rectangular frame comprises four bars 9, 10, 11, and 12, extending at right angles to the rotatable member 8 and fixedly secured thereto. Cross pieces, 13 and 14, connect the respective ends of the bars 9, 10, 11, and 12 together to form a rigid and sturdy rectangular frame.

When hexagonal shaped coils, such as are generally used for armature and stators of electric dynamos and motors, are to be formed, four slide blocks are provided. End slide blocks 15 are positioned at opposite ends of the frame, and are provided with legs 16 which slide within the grooves 17 formed in each of the frame forming bars 9, 10, 11, and 12. The blocks 15 are free to slide towards and away from each other lengthwise of the frame, the legs 16 being of sufficient length so that the blocks will slide smoothly and evenly.

An outer arm 20 is mounted within each of the slide blocks 15 and projects at right angles to the rotatable frame and parallel to the rotating axis thereof. The outer arms 20 may be provided with longitudinally extending grooves 21 on each side thereof which provide a track-way for the lugs 19 projecting inwardly from the slide blocks 15, as shown more particularly in Figures 4 and 7. The outer arms 20 may thus be adjusted laterally with respect to the blocks 15. The outer arms 20 receive the end portions of the coil during the winding operation, as will be brought out more fully hereafter.

A pair of intermediate arms, 22a and 22b, project laterally and are slidably mounted in one of the two intermediate blocks 24 while intermediate arms, 23a and 23b, are slidably mounted in the other intermediate block 24. The paired intermediate arms, 22a and 22b, and the paired intermediate arms, 23a and 23b, project laterally at right angles from the frame, extend parallel to the axis of rotation thereof, and slide longitudinally with respect to one another.

The intermediate slide blocks 24 are each provided with legs 25 which slide along bars 9, 10, 11, and 12 steadying the sliding movement of the blocks 24. The legs 25 may be so spaced as to slide or telescope over the adjacent end blocks 15, thereby assuring smooth sliding movement of the end blocks 15, and the intermediate blocks 24. The steadying legs 16 and 25 respectively may be curtailed in length, or entirely eliminated, if desired.

The paired intermediate arms, 22a and 22b, and the paired intermediate arms, 23a and 23b, are each provided with a longitudinally extending slot 26 at the frame end thereof. The intermediate blocks 24 are each provided with a web portion 27 which extends through the slots 26 of the associated paired intermediate arms. The web 27 serves to guide the sliding movement of the paired intermediate arms with respect to the associated intermediate slide block 24.

The intermediate arms, 22a and 23a, are arranged to support one side of the hexagonal coil, and the intermediate arms 22b and 23b are arranged to support the other side of the hexagonal coil. When the desired number of turns of wire have been wound upon the end arms 20 and the intermediate arms 22a and 23a, 22b and 23b, the coil is expanded so as to shape the same into hexagonal form. The shaping operation is accomplished by simultaneously drawing the arms 22a and 23a towards the supporting frame, and simultaneously pushing the intermediate arms 22b and 23b away from the supporting frame. It is understood that the expanding operation is performed after the winding operation has been completed and the rotating movement of the frame has stopped.

Mechanism is provided for performing the expanding operation substantially automatically by simply turning a crank 28. Referring more particularly to Figures 1, 3, and 6, the crank 28 is connected to a shaft 29 having a worm gear 30 at each end thereof. Each worm gear 30 meshes with and operatively engages a gear 31 fixed to a shaft 32 journalled in bearings 33 projecting from the sides of the intermediate slide blocks 24. The shafts 32 are also journalled in a suitable bracket 70 fixed to the rotating axle 8. The shafts 32 carry a gear 34 at each end thereof which meshes with a rack member 35 carried by and fixed to the intermediate winding arms. It will be noted that one of the shafts 32 is positioned on one side of the frame, and when rotated operates the intermediate winding arms 22a and 23a, while the other shaft 32 is positioned on the other side of the frame and operates the intermediate winding arms 22b and 23b. By referring to Figure 1, it is seen that by means of a single clockwise turn of the crank 28, the arms 22a and 23a are drawn towards the frame while the intermediate arms 22b and 23b are forced away from the frame into the position shown in Figure 12 thus operating to expand the coils. During this expansion movement, the end arms 20 move inwardly toward one another.

Means are provided on the outer arms 20, and on the intermediate arms 22a, 22b, 23a, and 23b for retaining the coils in position while being wound. Referring more particularly to Figure 8, the end arms 20 are each provided with a reduced end portion 50. Partition elements 51, each provided with a notch 52 therein, snugly fit over the reduced end portion 50. Spacer elements 53 are also provided with a notch 54, and they also fit over the reduced portion 50 of the arms 20. The spacer elements 53 are positioned between the partition elements 51 and are provided with an outer contour 55, which conforms to the desired inside contour of the end portion 200 of the coil. A coil is received between each pair of partition elements 51, and the wires forming the coil are all wound around a spacer element 53. Since the spacer elements 53 are removable and replaceable, any desired shape may be given in the end portions 200 of the coil by providing spacer elements 53 of the proper contour.

The cross sectional thickness of the coil may also be varied as desired by providing spacer elements 53 of corresponding width. It is understood that the spacer elements 53 may be permanently secured to the partition element 51 as an integral part thereof, if desired. The partition elements 51, and the spacer elements 53, are retained in position on and removed from the reduced end portion 50 of the end arms by adjusting a wing nut 56 which threads on to a threaded portion 57 extending from the reduced end portion 50.

The intermediate winding arms 22a, 22b, 23a, and 23b are also provided with portions 58, having mitered sides 59 to retain the spaced partition elements 60 thereon. Each of the partition elements 60 are provided with a dove-tailed slot 61 through which the mitered end portions 58 of the intermediate arms project. The partition elements 60 are placed upon the mitered end portions 58 by sliding the same endwise thereover.

The spacer elements 62, likewise provided with a dove-tail slot 63, slide over the mitered end portions 58. The partition elements 60, and the spacer elements 62, are thus locked in position on the end portions 58. The coils are each wound between a pair of the partition elements 60, having a spacer element 62 positioned between. The cross sectional width of the coils will depend upon the width of the spacer elements 62 mounted upon the intermediate arms, and upon the width of the spacer elements 55 mounted upon the end arms 20. The removable and replaceable spacer elements 55 and 62 may be supplied in sets to correspond to the desired shape and cross section of the coil to be formed.

The end partition element 64 may be modified by providing a projecting lug 65 which extends downwardly into the dove-tailed slot 61. The lug 65 may be inserted into an aperture 66, cut in the end portion 58 of the intermediate arms. The partition elements 60 and 64, the spacer elements 62, may all be locked in position by means of a set screw 67 which screws into the end of the end portion 58 and engages the lug 65 of partition element 64 extending into the aperture. The means for locking the various partition elements and spacer elements in place are here described for purposes of illustration only, as it is understood that they may be modified as conditions require without departing from the spirit of this invention.

It is now seen that any number of partition elements and spacer elements may be mounted on the respective intermediate and end arms of the machine so that a plurality of coils may be wound and shaped simultaneously. The number of coils which may be simultaneously formed is limited only by the power supplied to drive the various elements. The shape and form of the coils may also be varied as desired by providing spacer elements 53 and 62 of the proper size and shape. The machine can thus be made to shape and form almost every conceivable type of coil.

The expansion of the coil from its wound position requires that the outer arms 20 be moved closer together. Accordingly, means are provided for moving the outer arms 20 inwardly the required amount. By referring to Figures 1 and 4, it will be noted that a link 40 is connected to each of the outer slide blocks 15, and the adjacent intermediate slidable arms 22b and 23b. More particularly, one end of the link 40 is connected to a lug 41 projecting laterally from the outer block 15, and the other end of the link is provided with a hook 44 which hooks into an opening 43 provided in a connecting plate 42 secured to the rack 35 fixed to the intermediate winding arm. When the intermediate arms are drawn towards the frame work, the links 40 will draw the sliding outer blocks 15 carrying the outer arms 20 inwardly the proper corresponding amount. It is thus seen that the expanding operation of the coil is substantially automatic, is performed by a simple turning movement of the crank 28, and that any number of coils can be expanded in a single, simple operation.

The machine may be adjusted so that coils of any size may be made. Referring to Figures 3 and 4, a shaft 48, which is threaded at each end, it rotatably mounted within a suitable bearing carried by a bracket 71, secured to the rotating axle 8. The shaft 48 is rotated by a crank 45 connected to a worm gear 46, suitably journalled in the bracket 71. The worm gear 46 meshes with a gear 47, suitably fixed or splined to the shaft 48. The threaded ends of the shaft 48 each engage the threaded collar 49 mounted in the lug 39 extending from the intermediate slide blocks 24. By a simple turning movement of the crank 45 intermediate slide blocks 24 may be moved towards or away from each other the desired amount. The space distance between the intermediate arms determines the length of the side wall portions 201 of the coil. If the length of the side wall portions 201 of the coil is appreciably modified, the length of the side wall portions 202 may be correspondingly modified by manipulating the threaded adjusting nuts 80 and 81, so that the outer blocks 15 are adjusted inwardly or outwardly, as the case may be, the required distance to produce a uniformly shaped coil.

In order that the intermediate arms 22a and 23a, and the intermediate arms 22b and 23b be adjusted closer together or farther apart, the shaft 32 is provided with a spline or a groove 38 which engages with a corresponding spline or groove in the gears 34. The gears 34 are thus fixed to rotate with the shaft 32, but may be adjusted in any position lengthwise thereof. It is thus seen that the operating elements of the machine may be quickly and easily adjusted so as to permit the winding and expansion of any size of coil, and to furthermore permit the formation of a coil of almost every conceivable shape.

The racks 35 extend over the respective frame bars 9, 10, 11 and 12 and are secured to the respective intermediate arms 22a and 22b, 23a and 23b by means of screw bolts 37 extending through spacer blocks 36 and into the intermediate arms. This construction is fully illustrated in Figures 3, 4, and 5. The rack 35, as thus arranged, makes steady the sliding movement of the intermediate arms, and generally strengthens the construction.

Means are provided for suitably attaching the ends of the wire to the winding arms so that the winding arms when rotating will wind the wire into coils. The free ends of the wires may be attached to any one of the winding arms by means of a key member which is illustrated more particularly in Figures 15, 16, and 17. The key member comprises generally a round pin 83 having a semi-cylindrical shell member 84 hinged thereto by means of a hinge pin 85. A locking element 86, which may comprise a suitable ring telescopes over the pin 83 and shell member 84. The free ends of the wires W are placed between the pin 83 and the shell member 84, the shell member 84 then is tightened and closed around the body of the pin 83 and the wires locked to the pin by means of the ring 86. The pin member with the wires connected thereto is inserted or seated against the partition elements 51 of the outer winding arms or the partition elements 60 of the intermediate winding arms, as the case may be, and when the frame work and winding arms are rotated the wire is. looped or coiled around the arms. It is understood that the coils may be made from one continuous wire strand, or from two, three, or more continuous wire strands. The machine is adapted to form coils of any number of wire strands.

It is important that the wires be held taut while being wound into coils, and that a predetermined pull be exerted on the wires during the winding operation so that the wires will be compactly, tightly and smoothly laid. Mechanism for drawing the wire taut is shown more particularly in Figures 1 and 14, and comprises a rack member 75 carrying a cross arm 76. A cross piece 77 is clamped to the cross arm 76 by means of a suitable set screw 78. The wires extend between the cross piece 77 and the cross arm 76, and are drawn through. The pull required to draw the wire through may be varied as desired by adjusting the set screw 78. Friction padding 79 may be applied to the cross arm 76 and the cross piece 77, and the friction padding 79 may also be suitably grooved so as to retain the wires in their proper coil-forming position. The rack member 75 is free to swing or pivot so as not to hamper or interfere with the winding operation of the winding arms. The rack member 75 is provided with teeth 87 adapted to engage with a gear 88 fixed to a reciprocating shaft 89. The shaft 89 is suitably journalled in cross pieces 90, extending between the frame pieces 5 of the supporting table. A U-shaped member 91, fixed to the shaft 89, encircles the rack member 75 and retains the same in engagement with the gear 88. The member 75 carries a pin 94 adapted to adjustably engage with the teeth 95 on the sprocket wheel 93 permitting the member 75 to be held in any desired raised position. Any other convenient form of adjustment may be used within the scope of this invention.

The wires should be wound into the coils in smooth and even layers. This is accomplished by providing mechanism for weaving the wire or wires during the winding operation back and forth between the partition elements. The mechanism for weaving the wires into the coil is shown more particularly in Figure 1, comprising a rod 150, connected to the end of the shaft 89 by means of a suitable hinge pin 151. The other end of the rod 150 is journalled to a pinion 152 extending off-center from a wheel 153. The wheel 153 is fixed to a shaft 154, which rotates in a journal 155, carried by a bracket 156, secured to the frame structure 3 of the machine. The shaft 154 is connected to the drive shaft 1 of the machine through reduction gearing comprising intermeshing beveled gears 157 and 158 and gears 159 and 160. As the drive shaft 1, and the associated frame work and winding arms are rotated, the train of gears oscillates the connecting rod 150 and the shaft 89 which carries the member 75 and the cross arm 76. The cross arm 76 through which the wires are drawn is thus oscillated in timed relationship to the rotating movement of the winding arms, so that the wires forming the coils are laid smoothly side by side and in close compact layers. Any cross sectional width of coil may thus be quickly and efficiently formed from one or more wire strands.

In forming certain types of coils it may be desirable to firmly lock the coils within the partition elements during the expanding operation. This I propose to accomplish by the use of locking devices which are connected to the partition elements as shown more particularly in Figures 9, 10, and 11.

A locking key 170 comprising a flat bar is positioned in a suitable groove 180 provided in the top of each partition element 64. Locking keys are provided for the intermediate winding arms 22a, 22b, 23a and 23b, but are generally not needed in connection with the outer winding arms 20. The locking keys 170 are each provided with a head portion 171 which is connected by means of a pin 172 to a bracket 173 associated with the first partition element 174 preferably permanently fixed to the winding arm. The pin 172, shown more particularly in Figure 10, rotates in journals 175 provided in the bracket 173 projecting from the partition element 174.

Means are provided for adjusting of the locking key to accommodate coils of different size. This adjustment is effected by providing slots 176 cut through the spaced arms 177 extending from the head portion 171 of the locking key. The pivot pin 172 extends through the slots 176, as clearly shown in Figures 9 and 10. A connecting bar 178 is fixed to the ends of the spaced arms 177 and supports an adjusting screw 179 provided with a threaded end portion 181, which extends through a threaded opening provided in the pivot pin 172. The adjusting screw 179 carries a collar portion 182 rotatably retained between the connecting bar 178 and the top plate 183. By rotating the adjusting screw 179, connected as above described to the arm portions 177, the head portion 171 of the locking key may be moved towards or away from the partition elements 64. The locking key 170 is free to pivot around the pivot pin 172 and swing out of and into the grooves 180 provided in the partition elements 64, and at the same time it may be adjusted towards or away from the partition elements. Coils of different size may be conveniently wound around the winding arms and locked in position by means of the locking keys 170.

Means are provided for securely holding the free end 185 of the locking key in locked position. As shown more particularly in Figures 9 and 11, a U-shaped bracket 186 is pivotally connected by means of a pin 187 to the end partition element 64. A shoe 188 slides on the arm portions of the U-shaped bracket. The shoe 188 is provided with a projection 189 which is adapted to engage the outer end 185 of the locking key 170 when in coil retaining position. An adjusting screw 190 extends through the web portion 191 of the bracket and is rotatably retained in position by means of spaced collar portions 192 and 193 between which the web portion 191 of the bracket is positioned. The adjusting screw 190 is provided with a threaded portion 194 which extends through a threaded opening in the shoe 188. By manipulating the adjusting screw 190 the free end 185 of the locking key may be moved towards or away from the partition elements. The locking keys 170 are placed in locked position after the coils have been completely wound upon the winding arms, and prior to the expansion operation. When the coils have been completely wound, the locking keys 170 are swung into place so as to extend across the several partition elements, and adjusting screw 179 is manipulated to permit the locking key 170 to accommodate itself to the cross sectional size of the coils. The pivoted bracket 187 is then swung into position so that the shoe 188 extends over the free end 185 of the locking key. Adjusting screw 190 is then manipulated so as to move the shoe 188 firmly against the free end 185 of the locking key. The bracket member 186 preferably pivots about the pivot pin 187 with sufficient friction so that the bracket will remain in an erect position when adjustment has been made. It is thus seen that coils of any cross sectional shape or size may be firmly locked against movement between the partition elements so that the coils will retain their proper cross sectional shape during the expanding operation. The locking keys and associated adjusting device above described may be provided for in one or all of the winding arms as found convenient or desirable.

Mechanism is provided for recording the number of turns of wire applied to the coils. The recording mechanism may be set and adjusted to throw a switch and halt the winding movement of the machine when the desired number of turns have been applied to the coils. This mechanism is especially advantageous when coils having a large number of wire turns are to be formed since it relieves the operator from the tedious task of counting the number of turns applied during the winding operation. The operator can then give his attention to other details of the winding operation with the assurance that the coils will have the proper number of turns.

As shown in Figures 18, 19, and 20, a worm gear 100, carried by the drive shaft 1, meshes with a gear 101 connected to a shaft 102. The shaft 102 is rotatably supported in a bearing carried by a bracket 104 projecting from the V-frame 3 of the machine. The shaft 102 is detachably connected by means of a suitable clutch device to the windings recording device 135.

The drive shaft 1 is provided with a reducing end portion 106 which rotates in a bearing 107 carried by a supporting arm 105 extending from the end of the bracket 104. The driving motor or other suitable driving mechanism is operatively connected to a drive wheel 108 which idles on the shaft 1. The drive wheel 108 may be provided with a suitable groove 109 in the periphery thereof which receives the drive belt connected to the motor.

A clutch mechanism associated with the drive shaft 1 is provided, which under normal operating conditions is operatively connected to the drive wheel 108. An automatic clutch-throwing mechanism connected to the windings recording device 135 operates to disconnect the shaft 1 from the drive wheel 108. The clutch mechanism above referred to comprises generally a sleeve 112 fixed to the shaft 1. A brake-drum 111 extends from the sleeve 112 and is provided with a flanged portion 113 which is adapted to frictionally engage a complementary drum portion 110 extending laterally from the drive wheel 108. The periphery of the flanged portion 113 of drum 111 is inclined, as shown more particularly in Figure 18, so as to frictionally bind and engage the complementary inclined surface of the drum portion 110 associated with the drive wheel. The drum member 111 is normally held in frictional engagement with the complementary drum portion 110 by means of a coil spring 116 which seats against a ring 114 surrounding the sleeve 112. One end of the ring 114 seats against the collar portion 115 provided on the shaft 1, and the other end of the ring 114 is provided with an abutment which presses against one end of the coil spring 116. The other end of the coil spring seats against the drum member 111 and resiliently retains the drum member in frictional binding engagement with the drum portion 110 of the drive wheel 108.

A clutch disconnecting mechanism is provided for retracting the drum member 111 out of engagement with the drum portion 110 of the drive wheel. A second ring member 117 slidably telescopes over the ring member 114, and is operatively connected to the drum member 111 by means of headed studs 118 projecting from the drum member 111. The headed studs 118 extend through an outwardly flared flange 149 formed on the second ring member 117. The second ring member 117 is also provided with a circumferential groove 122 into which the pins 121, projecting inwardly from the Y-shaped arms 123, extend. The Y-shaped arms 123 extend from the end of a lever 119 pivoted on a pin 120 extending from the bracket 104. By manipulating the lever 119, the ring member 117 may be disengaged from driving contact with the drum portion 110 and the drive wheel idles on the shaft 1.

A coil spring 124 connected to the lever 119 and the bracket 104 normally operates to retain the drum member 111 out of driving contact with the drive wheel. The lever 119 is connected to one end of a pull member 125 by means of a pin 126. The pull member 125 extends through a suitable opening provided in the supporting frame 3 of the machine and is provided with a manipulating handle 127 which may be grasped by the operator so as to manipulate the lever 119 and throw the drum member 111 into operative frictional engagement with the drive wheel 108. By exerting a pull on the handle 127 against the action of the coil spring 124 the machine is operatively connected to the drive wheel 108 and the machine thrown into winding operation.

A locking bolt 131 is provided for releasably retaining the drum member 111 operatively connected to the drive wheel 108. The end portion of the locking bolt 131 engages within a notch 132 in the pull arm 125. The locking bolt 131 forms a part of the core of a solenoid 130 which is operatively connected to a suitable power source through a switch mechanism connected to the recording device 135, which will be presently described. The lock bolt 131 is provided with a collar portion 133 against which a coil spring 134 seats so as to normally retain the lock bolt in seating engagement with the notch 132 provided in the pull arm 135. When the locking bolt 131 is positioned in the notch 132, the drum member 111 is operatively connected to the drive wheel 108. When the solenoid 130 is energized the locking bolt 131 is withdrawn and the coil spring 124 is free to swing the lever 119 so as to throw the drum member 111 out of operative contact with the drive wheel 108. Rotation of the drive shaft 1 will then stop. The handle 127 is only manipulated to connect the drive wheel 108 to the drive shaft 1 so as to start the winding operation and the winding operation is halted when the solenoid 130 is energized so as to retract the locking bolt 131 permitting the coil spring 124 to throw the drum member 111 out of engagement with the drive wheel 108.

The electrical circuit which energizes the coil spring 130 includes a make and break switch of which the recording device 135 forms an integral part. The recording device 135 comprises a disc having a plurality of spaced holes 138 arranged around the periphery thereof. The recording disc normally idles on the shaft 136, but is operatively connected to shaft 102 by means of a clutch mechanism which will now be described.

The clutch mechanism associated with the recording device may be similar to the clutch associated with the drive shaft 1 above described, comprising essentially a sleeve 210 carrying a friction drum 211 adapted to operatively engage the drum portion 212 extending from the recording disc. The sleeve member 210 is fixed to the shaft 102 and rotates therewith. A ring member 213 telescopes over the sleeve 210 and abuts against the gear 101 which drives the shaft 102. The ring member 213 is provided with an abutment portion which retains the coil spring 214 pressed against the drum member 211. A second ring member 215 telescopes over the ring member 213 and retains the coil 214 in position.

Headed studs 216 project from the friction drum 211 through openings in the flange 217 which flares outwardly from the second ring member 215. A circumferential groove 218 extends around the second ring member 215 and is engaged by pins 219 extending inwardly from the Y-shaped arms 220 of the lever 221. The lever 221 is pivotally mounted from a stud 222 projecting from the supporting frame 3 of the machine. During the winding operation the drum member 211 of the clutch operatively engages the drum portion 212 of the recording device 135, and the recording device 135 thus rotates as the winding operation is in progress. The rotation of the recording device 135 is, however, immediately halted when the winding operation stops, preventing possible damage to the recording mechanism and associated switch device.

It will be noted that the pull arm 125 carries a cam shaped lug 223 on the lower edge thereof. The cam shaped lug 223 is adapted to ride over the curved end portion 224 of the lever 221 so as to rock the lever against the action of the coil spring 214, and retract the friction drum 211 from the drum portion 212 and thus disengage the recording device 135 from the shaft 102. Thus when the solenoid 130 is energized so as to withdraw the locking bolt 131, the coil spring 124 operates to disconnect the drive wheel 108 from the shaft 1 so as to stop the winding operation of the machine. Simultaneously with disconnecting movement of the lever 119, the cam shaped lug 223 of the pull arm 125 is drawn over the curved end portion 224 of the lever 221 so as to rock the lever 221 and disengage the recording device 135 from the shaft 102. The clutch mechanism associated with the drive shaft 1 and the clutch mechanism associated with the recording device 135 are so synchronized that rotation of the recording device 135 is halted simultaneously with, or a split second ahead of, the complete halting of the winding operation of the machine. This synchronized effect is accomplished by so arranging the cam lug 223 that it will rock the lever 221 and halt the rotation of the recording device a split second before the winding momentum of the drive shaft has been overcome by the load inertia.

The gear ratio between the gear 101 and the worm gear 100 is such that when the drive shaft 1 makes a complete revolution, the recording device 135 is rotated a predetermined number of degrees. The spaced distance between the holes 138 of the recording device 135 represents the angular distance which the recording device 135 travels during a complete revolution of the drive shaft 1. Consequently each spaced hole 138 represents a complete turn of the wire being wound into the coils. A switch arm 141 rotates on the stationary extension shaft 136 fixed to a bracket 145 extending from the supporting frame of the machine. The inner end of the shaft extension 136 makes a ball and socket connection with the end of the shaft 102. The switch arm 141 carries a pin 139, the inner end of which is adapted to be selectively inserted in the holes 138 of the recording disc. The pin 139 extends through an opening in a housing portion 144 formed in the arm 141 and carries a button 140 by means of which the pin 139 may be manipulated. The housing portion 144 contains a coil spring 146 which engages a collar portion 147 provided on the pin 139 so as to resiliently retain the end of the pin 139 seated within the selected hole 138 in the recording disc. By manipulating the head portion 140 of the pin 139 the switch arm 141 may be moved to any desired position and locked in the selected position by releasing the head 140 and permitting the pin 139 associated therewith to slip into the chosen hole 138.

One of the solenoid wires 148 is connected to the recording device 135 and the other solenoid wire 149 is connected to a switch terminal 230. The switch terminal 230 may be connected by insulation 231 to a supporting bracket 232, fixed to a stud 233, projecting from the bracket 104. When the recording device 135 has been rotated sufficiently to bring the switch terminal 143 extending from the switch arm 141 into electrical contact with the switch terminal 230, the solenoid circuit is closed, the solenoid 130 energized and the locking bolt 131 is retracted out of engagement with the pull arm 125.

One end of a clock spring 234 is connected to a stud 235 projecting from the recording disc, and the other end of the clock spring is suitably connected to the shaft extension 136. As soon as the recording device has been disconnected from the drive shaft 102 through the energization of the solenoid 130, the clock spring 234 operates to return the recording disc to the initial winding position. A projection 236 carried by the recording disc 135 is arranged to strike the stud 233 or other stationary part of the machine so as to limit the return movement of the recording disc. When the projection 236 is in abutment with the lug 233, the recording disc 135 indicates zero winding turns.

The recording device is simple to adjust and operate. For example, if a coil of six turns is desired, the pin 139 is inserted in the hole marked "6", shown in Figure 20. The handle 127 is pulled so as to operatively connect the drive wheel 108 to the drive shaft 1 and the machine is thrown into operation. The locking bolt 131 snaps into engagement with the notch 132 provided in the pull member 125 and retains the drive wheel 108 operatively connected to drive shaft 1. When six winding turns have been completed the contact portion 143 of the switch arm 141 has moved from its position as shown in Figure 20, into contacting position with respect to the switch terminal 230. When this occurs the solenoid circuit is closed, the solenoid 130 is energized and the lock bolt 131 withdrawn so as to permit the coil 124 to draw the cam shaped lug 223 of the pull arm 125 over the curved end portion 224 of the clutch lever 221 which in turn disengages the clutch drum 211 from the recording disc and permits the clock spring 234 to return the recording disc to neutral or zero winding position. Simultaneously with this movement, the lever 119 detaches clutch drum 111 from the drive wheel 108 so that the motor no longer rotates the drive shaft 1. The winding load on the drive shaft 1 is such as to almost immediately overcome the rotating momentum of the drive shaft and associated winding arms. The rotation of the drive shaft 1 can be set to halt substantially immediately upon effecting disconnection of the drive wheel 108 therefrom.

It is now seen that a coil-winding and forming machine has been presented upon which any number of coils may be wound simultaneously. The machine may be driven by motor, crank arm or other power means. Where a motor, or other mechanical power source is used, the machine may be thrown into operation by a simple pull exerted by the operator on the starting handle 127. Winding operation then continues until the desired number of wire strands have been wound into the coil. A switch mechanism and associated recording device is provided which may be adjusted to halt the machine when the desired number of turns have been placed into the coils. Means are provided for returning the recording mechanism back to neutral or zero winding position.

Little or no attention need be given by the operator to assure that the proper number of turns of wire are placed upon the coils. This feature of the invention is highly important, especially where a large number of turns of wire are to be placed upon each coil. The operator is thus permitted to give closer attention to the formation of the coils, and is relieved through automatic mechanism of the important responsibility of placing the exact number of turns on the respective coils. The human element in forming the coils is in this respect substantially eliminated.

Following the completion of the winding operation, all of the respective coils are simultaneously expanded by the simple manipulation of a crank by the operator. All of the coils are expanded simultaneously so as to be exact replicas of one another. The coil-expanding mechanism may be variously adjusted so as to permit both the winding and expansion of coils of different shape and size. Removable and replaceable partition elements associated with the winding arms permit the formation of coils of various cross sectional widths and contours. The end portions of the coils may be given any desired shape and contour so as to accommodate the same to any dynamo or motor by the application of partition elements of the required design. Thus, by the provision of removable and replaceable partition elements, and the various permissible adjustments of the winding arms, almost every conceivable shape, form and size of coil may be formed on the machine.

Locking keys are provided to compress into compact position the coils formed and applied to the winding arms. The locking keys retain the coils in fixed position on the winding arms and hold the respective turns of the coil immovable during the expansion operation. Mechanism is furthermore provided for weaving and laying the wire strands in even and smooth layers as the winding operation proceeds. The mechanism for performing this function is automatically operated and requires no attention from the operator. A simple locking pin is provided by means of which the ends of the wire strands may be directly connected to the winding arms.

It is thus seen that my coil-winding machine is substantially automatic in operation, and a large number of coils can be wound and shaped simultaneously on the machine. The operations are so simple and effective that when the winding of one set of coils is completed, the wire strands can be again connected to the machine so as to form another set of coils in the space of a few seconds. The machine has a very large output with a minimum of labor. The machine is substantially fool-proof in operation, is sturdy and strong in construction, and is relatively inexpensive to manufacture and assemble.

While certain novel features of this invention have been discussed in the specification, and are pointed out in the annexed claims, it will be understood that various omissions, substitutions and changes may be made by those skilled in the

What I claim is:

1. A coil winding and shaping machine comprising a rotatably mounted frame, winding arms extending laterally from said frame adapted to wind a plurality of coils simultaneously, means for shifting said arms to expand the coils wound thereon, and coil shaping elements removably positioned on said arms.

2. A coil winding and shaping machine comprising a rotatably mounted frame, winding arms extending laterally from said frame adapted to wind a plurality of coils simultaneously, and means for simultaneously manipulating said arms in a predetermined manner to expand the coils positioned thereon.

3. A machine for forming armature and stator coils comprising mechanism including winding arms for simultaneously winding a plurality of coils, and means for simultaneously shaping and expanding the coils wound on said arms.

4. A coil winding and shaping machine comprising a rotatable frame, winding arms projecting laterally from said frame and extending substantially parallel to one another, means associated with said arms for defining and shaping the cross section of said coils, and means for shifting said arms to expand the coils wound thereon.

5. A coil winding and shaping machine comprising a rotatable frame, blocks slidably mounted in said frame, winding arms adjustably mounted in said blocks and means for shifting said arms to expand the rolls wound thereon.

6. Apparatus for winding armature coils comprising a rotatable frame, winding arms projecting from said frame adapted to receive the coils, certain of said arms being arranged in pairs, and means for longitudinally shifting the said paired arms with respect to one another to expand and shape the coils wound thereon.

7. A coil forming machine comprising a supporting frame, winding arms projecting laterally from said frame, means for rotating said arms and frame so as to wind about said arms one or more coils of wire, and means for manipulating said arms to simultaneously expand the wire coils when the winding operation has been completed.

8. A coil forming machine comprising rotatably mounted winding arms extending substantially parallel to one another, certain of said arms being arranged in pairs, the arms comprising said pairs being longitudinally adjustable with respect to one another to expand the coils wound on said arms, and means for shifting other arms laterally closer to one another substantially simultaneously with the shifting of said longitudinally shiftable arms.

9. An armature winding machine comprising winding arms extending substantially parallel to one another, means for rotating said arms to wind one or more coils thereon, means for shifting certain of said arms longitudinally with respect to one another to effect expansion of the coils wound on said arms, and means for automatically drawing other arms closer to one another substantially simultaneously with the movement of said longitudinally shiftable arms.

10. A coil forming machine comprising a rotatably mounted frame, winding arms projecting laterally from said frame adapted to wind one or more coils of wire, removable and replaceable partition elements associated with said arms separating the coils and defining the cross sectional width thereof, and means associated with said partition elements for locking said coils in position.

11. A coil forming machine comprising a rotatably mounted frame, winding arms projecting laterally from said frame adapted to wind one or more coils of wire, partition elements associated with said arms separating the coils, and removable and replaceable spacer elements positioned between said partition elements defining and shaping the bend portions of the finished coils.

12. A coil forming machine comprising a rotatably mounted frame, winding arms projecting laterally from said frame adapted to wind one or more coils of wire, removable and replaceable partition elements associated with said arms separating the coils and defining the cross sectional width thereof, and removable and replaceable spacer elements positioned between said partition elements defining and shaping the bend portions of said coils.

13. A coil forming machine comprising a plurality of winding arms, means for rotating said arms to wind the coils thereon, partition elements associated with said arms separating the coils and defining the cross sectional width thereof, means for shifting said arms to expand the coils, and means associated with said partition elements for locking said coils in position during the expanding operation.

14. A coil forming machine comprising a plurality of winding arms, means for rotating said arms to wind the coils thereon, partition elements associated with said arms separating the coils and defining the cross sectional width thereof, means for shifting said arms to expand the coils, a locking device associated with said partition elements for retaining the coils in compact immovable position during expanding operation of the coils, means for adjusting said locking device with respect to said partition elements to accommodate coils of different cross section, and means for retaining said device in coil locking position.

15. A coil winding machine including winding arms extending substantially parallel to one another, means for rotating said arms to wind the coils thereon, means for automatically and simultaneously shifting certain of said arms longitudinally with respect to one another to effect the desired shaping and expansion of the coils wound thereon, said means including an operating element, and means connecting said operating element to said arms.

16. A coil winding machine comprising winding arms, coil retaining portions associated with said arms, means for rotating said arms to wind the coils thereon, and means for shifting certain of said arms longitudinally with respect to one another to effect the desired shaping and expansion of the coils wound on said arms.

17. A machine for winding a plurality of motor coils simultaneously including a rotatable frame, winding arms projecting laterally from said frame, means for rotating said frame and arms to wind the coils thereon, means for retaining the separate wires fed to said arms taut during the winding operation, and means for placing the wires forming the coils in compact and even layers.

18. A machine for winding a plurality of motor coils simultaneously including winding arms, coil retaining elements carried by said arms, means for rotating said arms to wind the coils thereon, and means for automatically moving the wire over the cross section of the coils during the winding operation so as to place the wires in uniform compact layers.

19. A coil winding machine including a rotatable frame, winding arms projecting laterally from said frame, means for rotating said frame so as to wind the coils on said arms, and means for halting the winding operation when the desired predetermined number of winding turns have been executed, said halting means including a recording device which may be set to indicate the number of winding turns desired, and automatic stop mechanism operatively connecting said recording device to a driving part of the machine.

20. In a coil forming machine, a plurality of winding arms, means for rotating said arms to wind the coils thereon, partition elements associated with said arms separating the coils and defining the cross sectional width thereof, and means associated with said partition elements for locking said coils in position.

21. In a coil forming machine, a plurality of winding arms, partition elements associated with said arms for separating the coils and defining the cross sectional width thereof, means for shifting said arms to expand the coils, and means associated with said partition elements for locking said coils in position during the expanding operation.

22. In a coil forming machine, a plurality of coil receiving elements, partitions associated with said elements separating the coils and defining the cross sectional width thereof, means for shifting said elements to expand the coils, a locking device associated with said partitions for retaining the coils in compact immovable position during the expanding operation of the coils, means for adjusting said locking device with respect to said partitions to accommodate coils of different cross section, and means for retaining said device in coil locking position.

23. In a coil forming machine, a plurality of coil receiving elements, means for rotating said elements to wind a coil thereon, partitions associated with said winding elements defining the cross sectional width of the coil, means for shifting said elements to expand the coil, a locking device associated with said partitions for retaining the coil in compact immovable position during the expanding operation of the coil, means for adjusting said locking device with respect to said partitions to accommodate coils of different cross section and means for retaining said device in coil locking position.

24. A coil forming machine including rotatively mounted winding arms, certain said arms being longitudinally adjustable with respect to one another to expand the coils wound on said arms, and means for shifting other arms laterally closer to one another substantially simultaneously with the movement of said longitudinally adjustable arms.

25. A coil winding and shaping machine including, a rotatable frame, blocks slidably mounted in said frame, winding arms adjustably mounted in said blocks and longitudinally shiftable with respect to one another to expand the coil wound on said arms, and means for shifting other arms laterally closer to one another substantially simultaneously with the shifting movement of said longitudinally shiftable arms.

26. A coil winding and shaping machine including a rotatable frame, blocks slidably mounted in a said frame, winding arms adjustably mounted in said blocks, means for longitudinally shifting certain of said arms to expand the coils wound thereon, and means for shifting certain of said blocks during the expanding operation to bring the arms carried thereby closer to one another.

27. A coil forming machine including winding arms extending substantially parallel to one another, means for rotating said arms to wind one or more coils thereon, means for shifting certain of said arms longitudinally with respect to one another to effect expansion of the coils wound on said arms, and means connecting said longitudinally shiftable arms to other laterally shiftable arms to draw said arms last mentioned progressively closer to one another as the expanding operation proceeds.

28. A coil forming machine including rotatively mounted winding arms, means for shifting certain of said arms longitudinally with respect to one another to effect the expansion of the coils wound on said arms, and link devices for automatically drawing other arms closer to one another substantially simultaneously with the movement of said longitudinally shiftable arms.

29. A coil forming machine including a plurality of rotatably mounted winding arms adapted to receive one or more coils wound thereon, certain of said arms being arranged in pairs, and means for shifting said paired arms longitudinally with respect to one another so as to expand the coils wound thereon.

30. A coil forming machine including spaced rotatably mounted winding arms, partition elements associated with said winding arms adapted to receive motor coils between said partitions, means for longitudinally shifting certain of said arms with respect to each other to simultaneously expand the coils wound on said arms, and means for disengaging the partition elements on certain of said arms to facilitate removal of the coils therefrom.

JULIUS REICHERT.